United States Patent
Liao et al.

(10) Patent No.: US 11,399,370 B2
(45) Date of Patent: Jul. 26, 2022

(54) VIRTUAL CARRIER CONFIGURATION AND OPERATION FOR WIRELESS SYSTEMS WITH LARGE CARRIER BANDWIDTH

(71) Applicant: MEDIATEK INC., Hsinchu (TW)

(72) Inventors: Pei-Kai Liao, Nantou County (TW); Chia-Chun Hsu, New Taipei (TW); Tao Chen, Beijing (CN)

(73) Assignee: MediaTek INC., Hsin-Chu (TW)

( * ) Notice: Subject to any disclaimer, the term of this patent is extended or adjusted under 35 U.S.C. 154(b) by 126 days.

(21) Appl. No.: 16/140,798

(22) Filed: Sep. 25, 2018

(65) Prior Publication Data

US 2019/0029022 A1    Jan. 24, 2019

Related U.S. Application Data

(63) Continuation of application No. PCT/CN2017/078929, filed on Mar. 31, 2017.
(Continued)

(51) Int. Cl.
*H04W 72/04*    (2009.01)
*H04W 76/27*    (2018.01)
(Continued)

(52) U.S. Cl.
CPC ......... *H04W 72/0453* (2013.01); *H04L 5/001* (2013.01); *H04L 5/005* (2013.01);
(Continued)

(58) Field of Classification Search
CPC ............. H04W 72/0453; H04W 76/27; H04W 72/0406; H04W 80/02; H04L 5/0064;
(Continued)

(56) References Cited

U.S. PATENT DOCUMENTS 10,219,280 B2 * 2/2019 Webb ............... H04L 5/0007
2011/0034175 A1 2/2011 Fong et al. ............ 455/450
(Continued)

FOREIGN PATENT DOCUMENTS

CN   WO 2011/038252 A2    9/2009
CN     103108392 A    11/2011
(Continued)

OTHER PUBLICATIONS

International Search Report and Written Opinion of International Search Authority for PCT/CN2017/078929 dated Jun. 28, 2017 (11 pages).
(Continued)

*Primary Examiner* — Mounir Moutaouakil
(74) *Attorney, Agent, or Firm* — Imperium Patent Works; Helen Mao; Zheng Jin

(57) ABSTRACT

Apparatus and methods are provided for virtual carrier operation in wireless systems with large carrier bandwidth. In one novel aspect, virtual carrier (VC) with a block of physically contiguous radio resources within a component carrier is configured. In one embodiment, the UE configures a downlink (DL) common virtual carrier (CVC) and an uplink (UL) CVC, which carry control information for the UE, and one or more DL/UL dedicated VCs (DVCs), which carry data services. In one embodiment, the UE obtains the CVC configuration information including the channel bandwidth and the physical location through system information. In another embodiment, the UE obtains DVC configuration through a RRC-layer signaling. In another novel aspect, the UE obtains a VC configuration switch command through either a MAC signal or a PHY signal, and subsequently reconfigures one or more configured VCs based on the received switch command.

17 Claims, 7 Drawing Sheets

Related U.S. Application Data

(60) Provisional application No. 62/315,699, filed on Mar. 31, 2016, provisional application No. 62/394,274, filed on Sep. 14, 2016, provisional application No. 62/436,008, filed on Dec. 19, 2016.

(51) Int. Cl.
*H04L 5/00* (2006.01)
*H04W 80/02* (2009.01)

(52) U.S. Cl.
CPC .......... *H04L 5/0053* (2013.01); *H04L 5/0064* (2013.01); *H04L 5/0098* (2013.01); *H04W 72/0406* (2013.01); *H04W 76/27* (2018.02); *H04W 80/02* (2013.01)

(58) Field of Classification Search
CPC ..... H04L 5/001; H04L 5/0053; H04L 5/0098; H04L 5/005
See application file for complete search history.

(56) References Cited

U.S. PATENT DOCUMENTS

| | | | |
|---|---|---|---|
| 2012/0046032 A1* | 2/2012 | Baldemair | H04W 72/0413 455/434 |
| 2012/0201162 A1* | 8/2012 | Kim | H04B 17/345 370/252 |
| 2013/0010964 A1 | 1/2013 | Fong et al. | 380/277 |
| 2013/0195073 A1* | 8/2013 | Chen | H04L 5/0032 370/331 |
| 2014/0010183 A1* | 1/2014 | McNamara | H04L 5/0094 370/329 |
| 2014/0044027 A1* | 2/2014 | Beale | H04W 56/00 370/311 |
| 2014/0301265 A1* | 10/2014 | Liu | H04W 16/04 370/311 |
| 2015/0124638 A1* | 5/2015 | Sun | H04L 1/0027 370/252 |
| 2015/0280877 A1* | 10/2015 | Chen | H04W 24/10 370/252 |
| 2015/0289144 A1* | 10/2015 | Yi | H04W 72/042 370/252 |
| 2015/0334730 A1* | 11/2015 | Wakabayashi | H04L 5/006 370/329 |
| 2015/0373624 A1 | 12/2015 | Webb et al. | 370/336 |
| 2016/0043843 A1 | 2/2016 | Liu et al. | 370/329 |
| 2017/0086175 A1* | 3/2017 | Yasukawa | H04W 72/0453 |
| 2017/0332267 A1* | 11/2017 | Kim | H04L 5/00 |
| 2020/0084054 A1* | 3/2020 | Yi | H04J 3/02 |

FOREIGN PATENT DOCUMENTS

| | | |
|---|---|---|
| EP | 2946623 A1 | 1/2013 |
| JP | 2946623 A1 | 1/2014 |
| JP | 2946623 B1 | 1/2014 |
| WO | WO2011017515 A2 | 6/2009 |
| WO | WO2011038252 A2 | 9/2009 |
| WO | WO2014111695 A1 | 1/2013 |
| WO | WO2014147397 A1 | 3/2013 |
| WO | WO2015174328 A1 | 5/2014 |

OTHER PUBLICATIONS

EPO, search report for the EP patent application 17773287.2 dated Mar. 13, 2019 (11 pages).
Intellectual Property India, search report for the IN patent application No/201827037888 dated Dec. 18, 2020 (6 pages).
European Patent Office, Office Action, dated Nov. 16, 2021 (5 pages).

* cited by examiner

FIG. 4A                    FIG. 4B

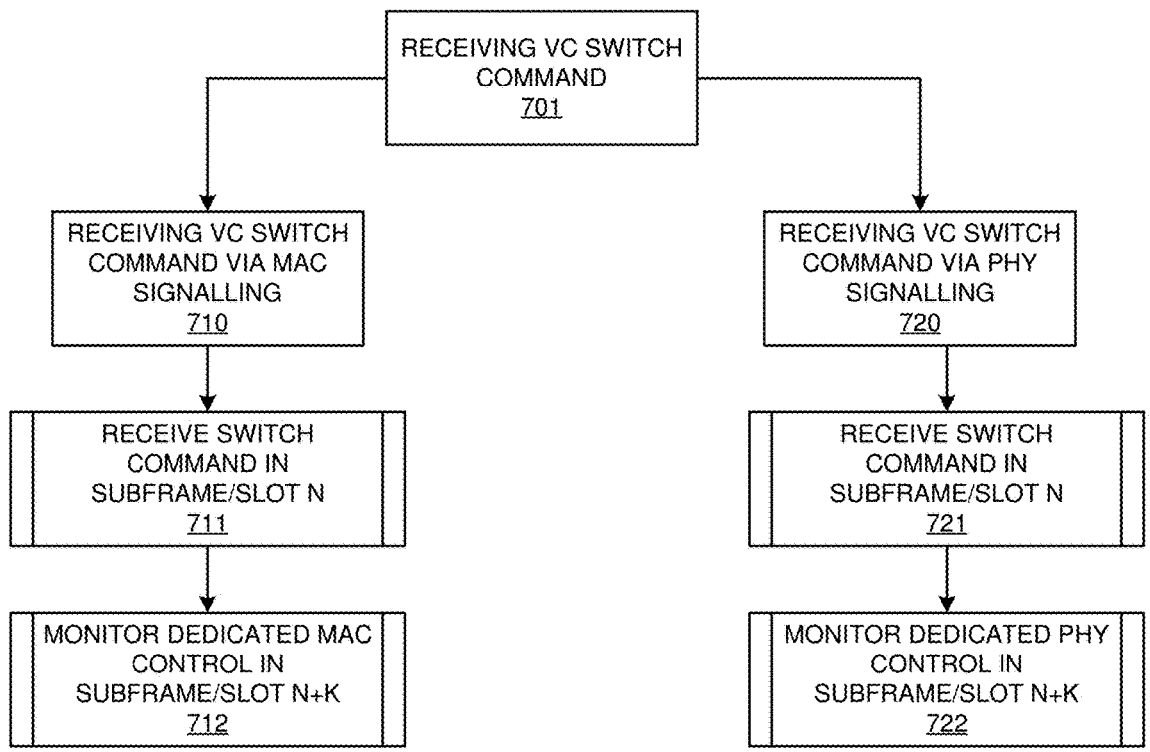
FIG. 7
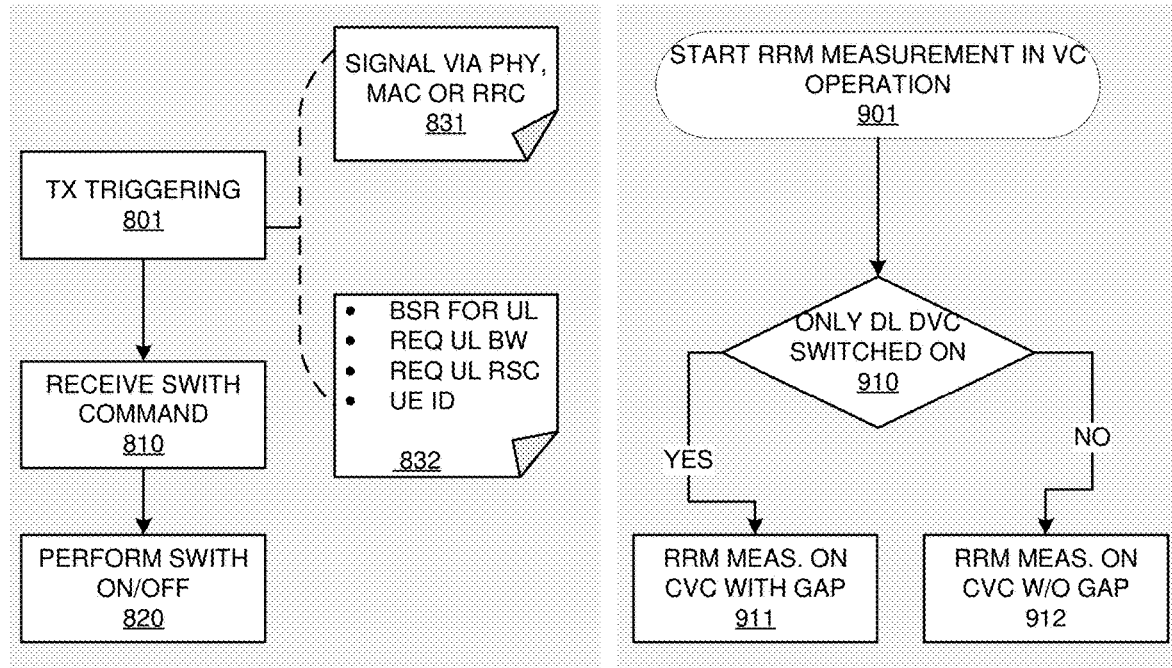
FIG. 8
FIG. 9

VIRTUAL CARRIER CONFIGURATION AND OPERATION FOR WIRELESS SYSTEMS WITH LARGE CARRIER BANDWIDTH

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2017/078929, with an international filing date of Mar. 31, 2017, which in turn claims priority under 35 U.S.C. § 119 U.S. provisional application 62/315,699 filed on Mar. 31, 2016, application 62/394,274 filed on Sep. 14, 2016, and application 62/436,008 filed on Dec. 19, 2016. This application is a continuation of International Application No. PCT/CN2017/078929, which claims priority from U.S. Provisional Application Nos. 62/315,699, 62/394,274, and 62/436,008. International Application No. PCT/CN2017/078929, and the United States is a designated state in International Application No. PCT/CN2017/078929. This application claims the benefit under 35 U.S.C. § 119 from U.S. Provisional Application Nos. 62/315,699, 62/394,274, and 62/436,008. The subject matter of each of the foregoing documents is incorporated herein by reference.

TECHNICAL FIELD

The disclosed embodiments relate generally to wireless communication, and, more particularly, to methods and apparatus for efficient operation for large carrier bandwidth.

BACKGROUND

Mobile networks communication continues to grow rapidly. The mobile data usage will continue skyrocketing. New data applications and services will require higher speed and more efficient. Large data bandwidth application continues to attract more consumers. New technologies are developed to meet the growth such as carrier aggregation (CA), which enables operators, vendors, content providers and the other mobile users to meet the increasing requirement for the data bandwidth. However, carrier aggregation assumes multiple RF chains for signal reception even for physically contiguous spectrum, which introduces long transition time to activate more carriers from one carrier for larger data bandwidth and decreases the efficiency of the data transmission.

In frequency bands above 3 GHz, there could be a block of physically continuous spectrum up to hundreds of MHz. The single carrier operation for such large continuous spectrum is more efficient in both the physical (PHY) control, with lower control signaling overhead, and PHY data, with higher trunking gains. It is, therefore, to configure the large contiguous spectrum for large data transmission instead of configuring multiple small spectrum resources. However, from the system level, not all the user equipments (UEs) require large channel bandwidth. Further, for each UE, not all applications require large channel bandwidth. Given that wideband operation requires higher power consumption, the use of the large spectrum resource for control signaling monitoring and low-data-rate services is not ideal for power saving and bandwidth efficiency.

Improvements and enhancements are required for efficient operation for systems with large carrier bandwidth.

SUMMARY

Apparatus and methods are provided for virtual carrier operation in wireless systems with large carrier bandwidth.

In one novel aspect, virtual carrier (VC) with a block of physically contiguous radio resources within a component carrier is configured. In one embodiment, the UE acquires synchronization and system information with a first channel bandwidth over one component carrier and one or more component carrier is configured after completing network entry. The UE is configured with a downlink (DL) common virtual carrier (CVC) and an uplink (UL) CVC for each component carrier, wherein the DL CVC and UL CVC carry control information for the UE. The UE is configured with one or more DL/UL dedicated VCs (DVCs), which carry data services for each component carrier. The UE activates the configured VCs over the activated component carriers. In one embodiment, the UE obtains the CVC configuration information including the channel bandwidth and the physical location through system information. In another embodiment, the UE obtains DVC configuration through a RRC-layer signaling. In one embodiment, the UE performs a radio resource management (RRM) measurement on the DL CVC without measurement gap if both the DL CVC and the one or more DL DVCs within a component carrier are switched on; otherwise, the UE performs a RRM measurement on the DL CVC with a measurement gap, when only the one or more DL DVCs within a component carrier are switched on.

In another novel aspect, the UE switches on/off the configured VCs upon receiving the switch command. In one embodiment, the UE obtains a VC configuration switch command and subsequently switch on/off one or more configured VCs based on the received switch command. In one embodiment, the switch command is through a MAC signaling. In another embodiment, the switch command is through a PHY signaling. In yet another embodiment, the UE transmits a triggering switch signal to the network and receives a switch command for UL VCs. The UE performs the VC switch procedure based on the switch command for UL VCs.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4A shows an exemplary diagram for the UE in the idle mode, operates with accessing the CVC in the Pcell only in accordance with embodiments of the current invention.

FIG. 4B shows an exemplary diagram for UE in a connected mode, the UE can access in a CVC and DVC in the PCell in accordance with embodiments of the current invention.

FIG. 7 illustrates an exemplary flow diagram of virtual carrier switch-on/off procedure in accordance with embodiments of the current invention.

FIG. 8 illustrates an exemplary flow diagram of UE triggered UL VC switch command in accordance with embodiments of the current invention.

FIG. 9 illustrates an exemplary flow diagram of the RRM measurement for virtual carriers in accordance with embodiments of the current invention.

DETAILED DESCRIPTION

Reference will now be made in detail to some embodiments of the invention, examples of which are illustrated in the accompanying drawings.

Figure 1:
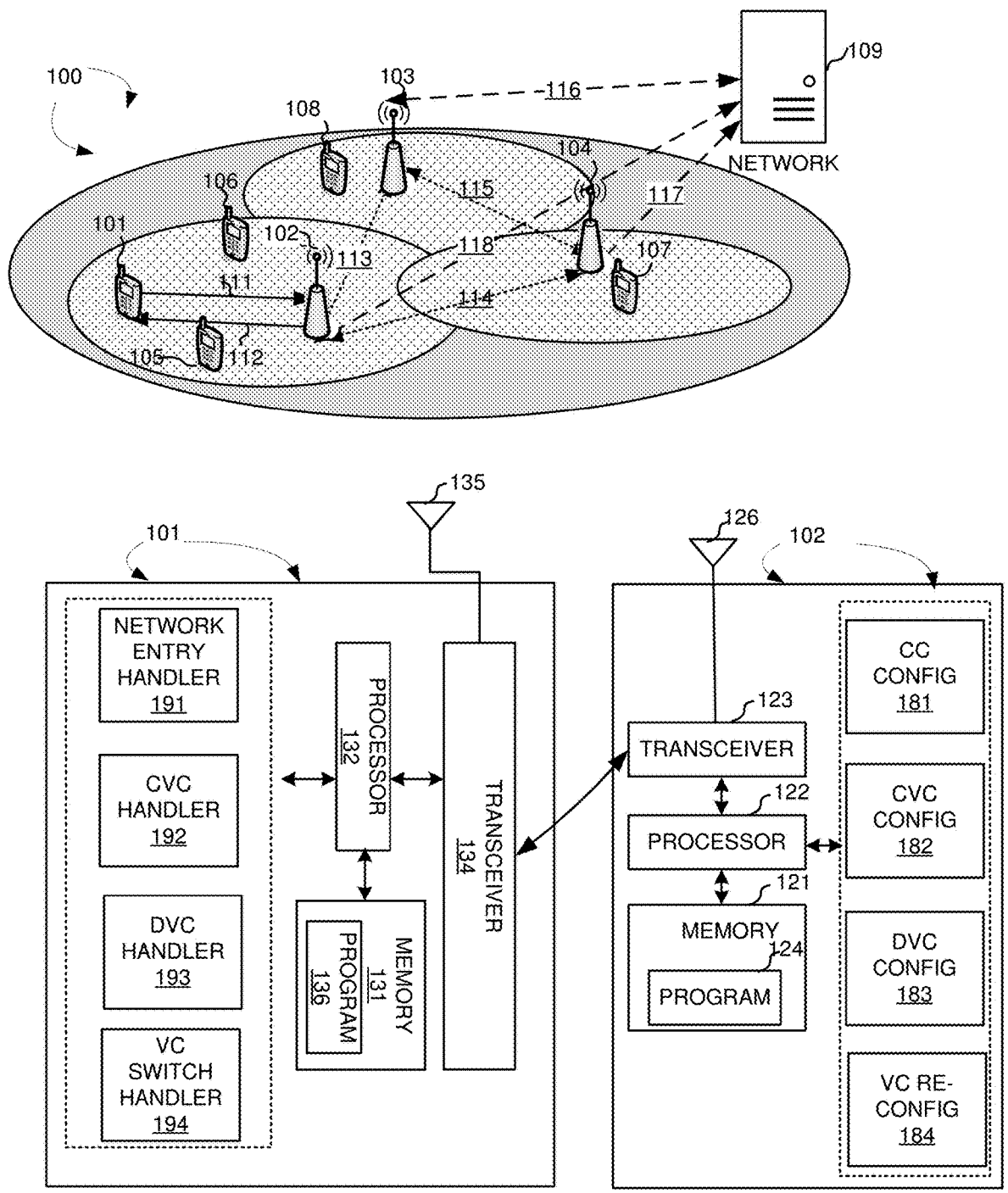
FIG. 1 illustrates a system diagram of a wireless network with virtual carriers configured in accordance with embodiments of the current invention.

FIG. 1 illustrates a system diagram of a wireless network 100 with virtual carriers configured in accordance with embodiments of the current invention. Wireless communication system 100 includes one or more wireless networks each of the wireless communication network has a fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, or by other terminology used in the art. Each of the base unit 102, 103, and 104 serves a geographic area. Backhaul connections 113, 114 and 115 connect the non-co-located receiving base units, such as 102, 103, and 104. These backhaul connections can be either ideal or non-ideal A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103.

In one embodiment, wireless communication network 100 operates with large contiguous radio spectrums. UE 101 while accessing wireless communication network 100, acquires synchronization information and system information using a default bandwidth. Upon detecting the wireless network, UE 101 can get component carrier configuration (e.g. cell identification) and initial virtual carrier configuration through system information. A virtual carrier (VC) is a block of physically contiguous radio resources within a component carrier. In one embodiment, multiple VCs within a component carrier may share the same cell ID. In another embodiment, multiple VCs within a component carrier may use different cell IDs. When UE 101 accesses the network, a downlink (DL) common virtual carrier (CVC) is configured to the UE. The DL CVC is used for network entry, idle mode operation, radio resource management (RRM) measurement and data services. The DL CVC has beacon signal (or synchronization signal), system information, common PHY control and reference signal for RRM measurement. The physical location in frequency domain of the CVC can be at the center of a component carrier or any other location of the component carrier. In one embodiment, UE 101 gets the channel bandwidth of the DL CVC and an offset value of the DL CVC from the central frequency of the component carrier in the system information. There are physical channels and reference signals, such as pilots for demodulation or channel state information measurement, to support the dedicated control and/or data operation. In one embodiment, there is one single DL CVC within a component carrier for UE 101. There could be multiple DL CVCs for multiple UEs within one component carrier. An uplink (UL) CVC configuration including the bandwidth and the physical location in frequency domain of the UL CVC is also broadcasted in the system information. There is common PHY control for random access (RACH) in the UL CVC. There are channels and reference signals (e.g. pilots for demodulation or channel state information measurement) to support dedicated PHY control/data operation. In one embodiment, There are channels and reference signals, such as pilots for demodulation or channel state information measurement, to support dedicated PHY control/data operation. In one embodiment, for UE 101, there is single uplink CVC within a component carrier. There could be single or multiple uplink CVCs within a component carrier from system aspects.

Besides the DL and UL CVCs that carry control information, one or more DL and UL dedicated VCs (DVCs) are configured for UE 101. A DL DVC is used for data services only. In one embodiment, the bandwidth & physical location in frequency domain are configurable by RRC-layer signaling. One or more UL DVCs may also configured for UE 101. There is no common PHY control for random access (RACH). There are channels and reference signals, such as pilots for demodulation or channel state information measurement, to support dedicated PHY control/data operation. The dedicated PHY control is used at least for HARQ-ACK, channel state information (CSI) feedback. For both the DL DVC and the UL DVC, the bandwidth & physical location in frequency domain are configurable by RRC-layer signaling.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a component carrier (CC) configurator 181 that configures CCs, a CVC configurator 182 that configures CVCs, a DVC configurator 183 that configures DVCs, and a VC reconfiguration handler that reconfigures VCs.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A network entry handler 191 acquires synchronization and system information with a first channel bandwidth in a wireless network, wherein the first channel bandwidth is a default bandwidth configured by the wireless network, and wherein one or more component carriers is configured. A common virtual carrier handler 192 configures a DL CVC and a UL CVC, wherein a virtual carrier (VC) is a block of physically contiguous radio resources within a component carrier, and wherein the DL CVC and UL CVC carry common/group-common PHY control information for the UE. A dedicated VC handler 193 configures one or more DL and UL dedicated virtual carriers (DVCs), wherein the one or more DL and UL DVCs carry data services. A VC switch handler 194 switches on or off one or more VCs.

Figure 2A:
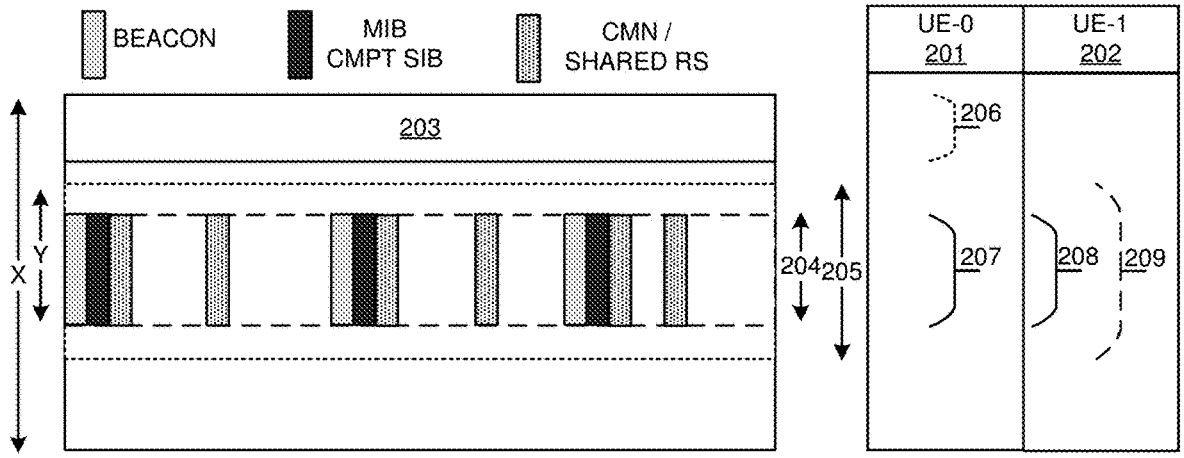
FIG. 2A illustrates an exemplary diagram of a DVC configured with no control information in accordance with embodiments of the current invention.
Figure 2B:
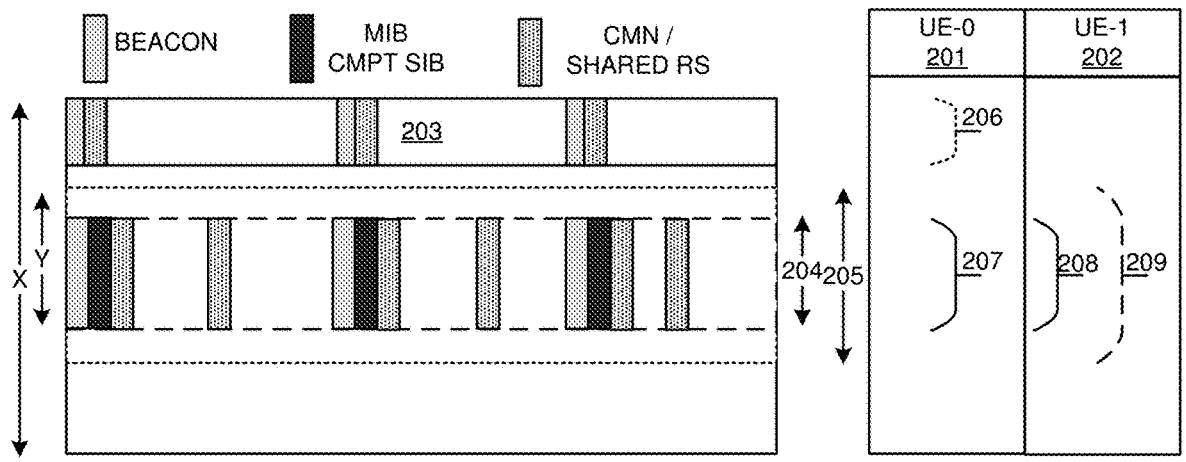
FIG. 2B illustrates an exemplary diagram of a DVC configured with beacon signal and common/shared reference signal information in accordance with embodiments of the current invention.
Figure 2C:
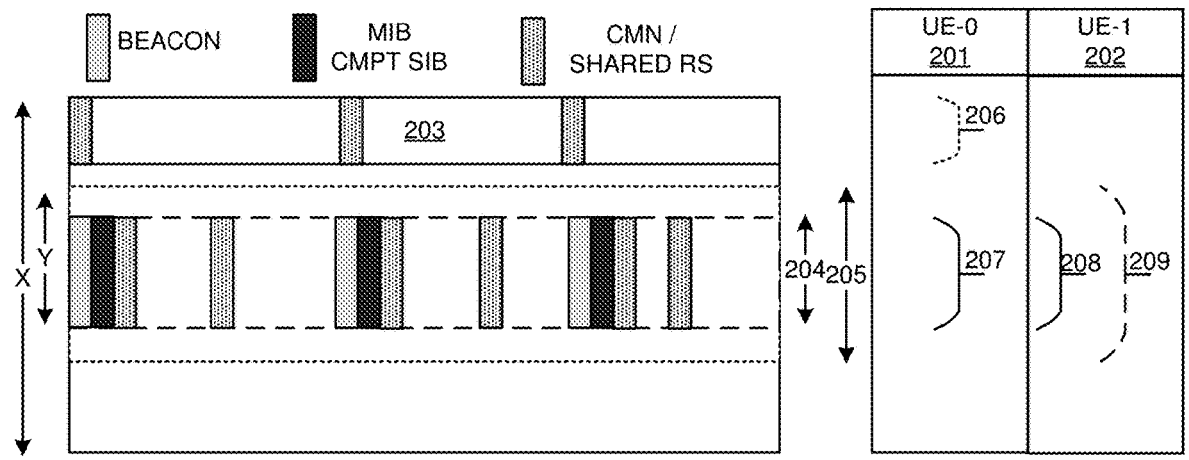
FIG. 2C illustrates an exemplary diagram of a DVC configured with beacon signal information in accordance with embodiments of the current invention.

The virtual carriers are configured as different types including a DL CVC, a DL DVC, a UL CVC, and a UL DVC. In different embodiments, the different types of virtual carriers may carry different information. FIGS. 2A, 2B, and 2C illustrates different configurations for the virtual carriers.

FIG. 2A illustrates an exemplary diagram of a DVC configured with no common/group-common PHY control information in accordance with embodiments of the current invention. FIG. 2A shows a component carrier with a bandwidth of X MHz is configured into multiple VCs. A VC 203 is configured as a DVC. A VC 204 is configured as a CVC. A VC 205 is configured as a DVC. In one embodiment, the component carrier may be configured for multiple UEs. As shown, UE 201 is configured with CVC 207, which corresponds to the configured CVC 204. UE 201 is also configured with a DVC 206, which corresponds to the configured DVC 203. Similarly, UE 202 is configured with a CVC 208, which also corresponds to the configured CVC 204. UE 202 is also configured with a DVC 209, which corresponds to the configured DVC 205. As shown, DVC 205 may overlap with CVC 204. UE 201 has CVC and DVC in non-overlapping frequencies while UE 202 had CVC and DVC in overlapped frequencies. In one embodiment, the CVCs contain the beacon signal (or synchronization signals), the MIB/compact SIB signal, and the common/shared reference signal. In one embodiment, DVC 203 has no common/group-common PHY control information.

FIG. 2B illustrates an exemplary diagram of a DVC configured with beacon signal (or synchronization signals) and common/shared reference signal information in accordance with embodiments of the current invention. Similar to FIG. 2A, multiple CVC and DVC are configured for the component carrier. Each UE 201 and 202 has the same CVC and DVC configuration. In one embodiment, the DVC also contains the beacon signal (or synchronization signals) and the common/shared reference signal.

FIG. 2C illustrates an exemplary diagram of a DVC configured with common/shared reference signal (or synchronization signals) information in accordance with embodiments of the current invention. Similar to FIG. 2A, multiple CVC and DVC are configured for the component carrier. Each UE 201 and 202 has the same CVC and DVC configuration. In one embodiment, the DVC also contains the common/shared reference signal.

Figure 3:
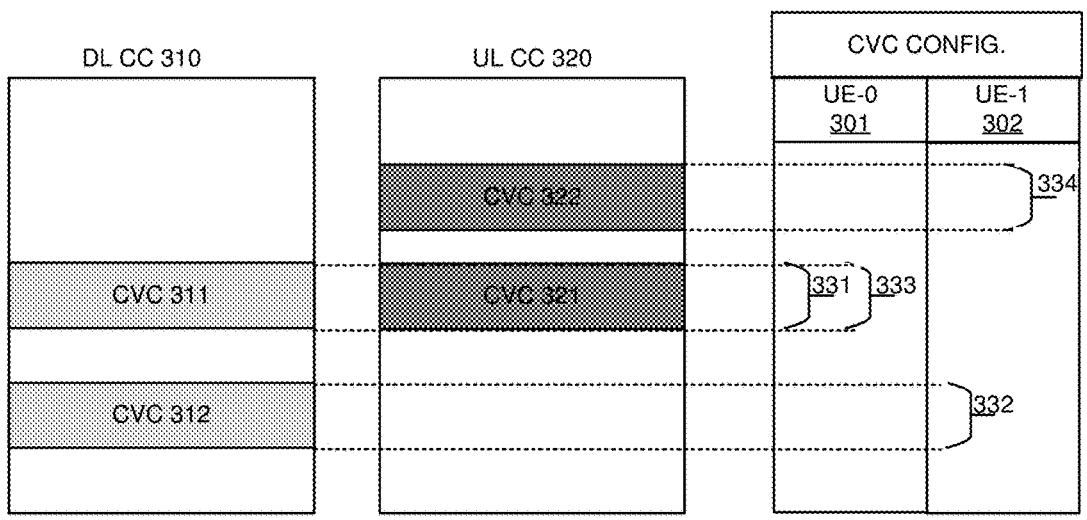
FIG. 3 illustrates different configures of DL and UL CVCs for a UE in accordance with embodiments of the current invention.

FIG. 3 illustrates different configures of DL and UL CVCs for a UE in accordance with embodiments of the current invention. In one novel aspect, the UE is configured with a DL CVC and a UL CVC to carry the DL and UL control information, respectively. In one embodiment, the DL CVC and the UL CVC can have the same frequency location within a component carrier for TDD or unpaired spectrum. In another embodiment, the DL CVC and the UL CVC have different frequency locations within a component carrier for TDD or unpaired spectrum are located in different frequency bands for FDD or paired spectrum. A DL CC 310 is configured with two CVCs, CVC 311, and CVC 312. A UL CC 320 is configured with two CVCs, CVC 322, and CVC 321. As shown, UE 301 is configured with a DL CVC 331 corresponding to DL CVC 311, and a UL CVC 333 corresponding to UL CVC 321. DL CVC 311 and UL CVC 321 have the same frequency location within a component carrier for TDD or unpaired spectrum is located in different frequency bands for FDD or paired spectrum. In another embodiment, UE 302 is configured with a DL CVC 332 corresponding to DL CVC 312, and a UL CVC 334 corresponding to UL CVC 322. DL CVC 312 and UL CVC 322 have the different frequency locations within a component carrier for TDD or unpaired spectrum are located in different frequency bands for FDD or paired spectrum.

Figure 4C:
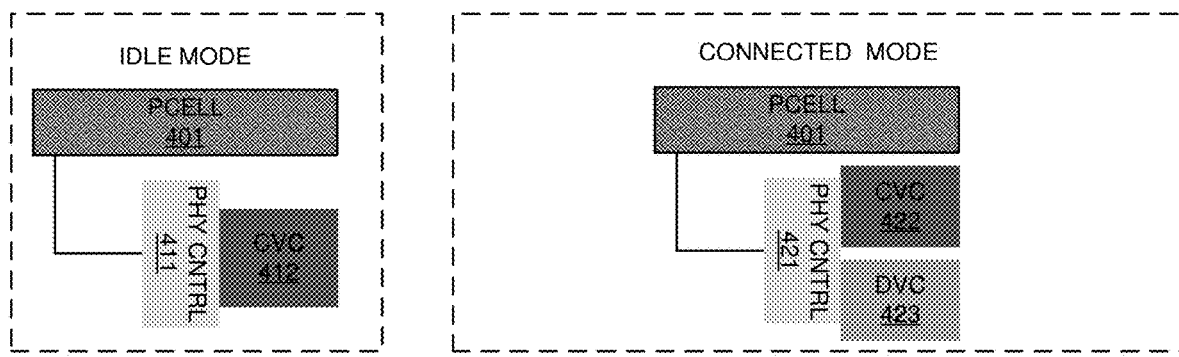
FIG. 4C shows an exemplary diagram for UE in a connected mode, the UE can access in a SCell in accordance with embodiments of the current invention.
Figure 4C:
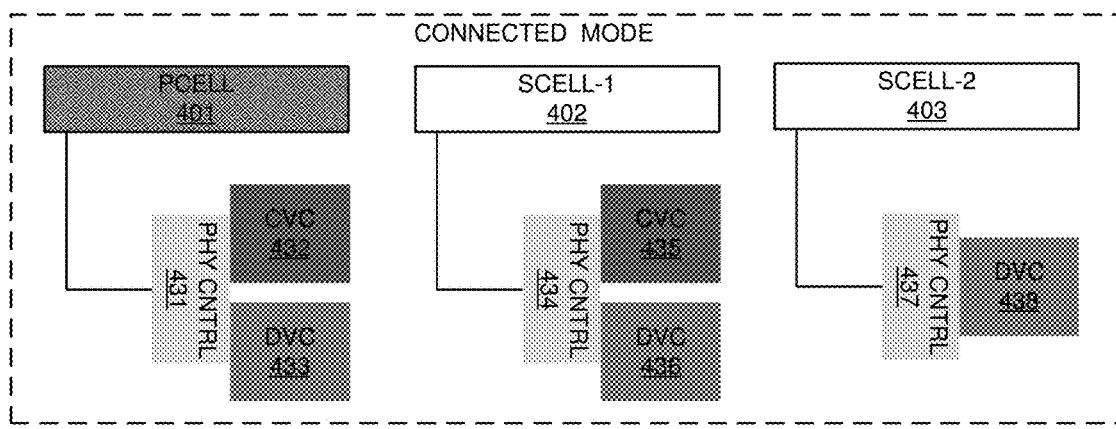

The UE configured with VCs may access search spaces, both the common search space and the UE-specific search space differently based on the UE configuration and the VC configurations. In general, the UE in the idle mode, the UE operates with accessing the CVC in the Pcell only. For the UE in a connected mode, the UE can access in a Pcell the CVC only, or both the CVC and the DVC. For a UE in the connected mode, the UE can operate in the Scell with accessing the CVC only, or both the CVC and the DVC, or the DVC only. FIGS. 4A, 4B, and 4C illustrate different search-space access scheme for UE in the idle and the UE in the connected mode with different primary cell (PCell) and secondary cell (Scell) configuration.

FIG. 4A shows an exemplary diagram for the UE in the idle mode, operates with accessing the CVC in the Pcell only in accordance with embodiments of the current invention. The UE access a PCell 401 in the idle mode. The UE accesses the CVC 412 of the PCell through a configured region of PHY control 411. As shown, when the UE accesses DL common VC only within PCell 401 only, the UE performs the detection for broadcast or UE-specific downlink control information in the common search space of the downlink physical control channel 411 over the DL common VC 412. The UE performs the detection for UE-specific downlink control information in the UE-specific search space, which could be in a different physical location from the common search space, of the downlink physical control channel 411 over the DL common VC 412.

FIG. 4B shows an exemplary diagram for UE in a connected mode, the UE can access in a CVC and DVC in the PCell in accordance with embodiments of the current invention. The UE access a PCell 401 in the connected mode. The UE accesses the CVC 422 and DVC 423 of the PCell through a configured region of PHY control 421 of PCell 401. As shown, when the UE accesses both DL CVC 422 and at least one DL DVC 423 within a primary component carrier 401, the UE performs the detection for broadcast or UE-specific downlink control information in the common search space of the downlink control channel over the DL common VC. The UE performs the detection for UE-specific downlink control information in the UE-specific search space of the downlink control channel. In one embodiment, the UE performs the detection for the UE-specific downlink control information in the UE-specific search space over the aggregated radio resources of the DL common VC and all dedicated VC(s). In another embodiment, the UE performs the detection for the UE-specific downlink control information in the UE-specific search space over the aggregated radio resources of all dedicated VC(s).

FIG. 4C shows an exemplary diagram for UE in a connected mode, the UE can access in a SCell in accordance with embodiments of the current invention. The UE access a PCell 401, a SCell 402, and a SCell 403 in the connected mode. The UE accesses the CVC 432 and DVC 433 of the PCell through a configured region of PHY control 431 of PCell 401. The UE accesses the CVC 435 and DVC 436 of the SCell 402 through a configured region of PHY control 434. The UE accesses the DVC 438 of the SCell 403 through a configured region of PHY control 437. In one embodiment, when the UE accesses DL CVC 435 only within a secondary component carrier, the UE performs the detection for UE-specific downlink control information in the UE-specific search space of the downlink physical control channel over the DL common VC. In another embodiment, when the UE accesses both DL CVC 435 and at least one DL DVC 436 within a secondary component carrier 402, the UE performs the detection for UE-specific downlink control information in the UE-specific search space-1 of the downlink control channel over the DL common VC. The UE performs the detection for UE-specific downlink control information in the UE-specific search space-2 of the downlink control channel over the DL dedicated VC. In one embodiment, the UE performs the detection for UE-specific downlink control information in the UE-specific search space over the aggregated radio resources of the DL common VC and all dedicated VC(s). In another embodiment, the UE performs the detection for UE-specific downlink control information in the UE-specific search space over the aggregated radio resources of all dedicated VC(s). In yet another embodiment, when the UE can access DVC 438 only within a secondary component carrier 403, the UE-specific search space for UE-specific downlink control information (DCI) is defined within the physical DL control channel over the DL dedicated VC(s). In one embodiment, the UE performs UE-specific search space for UE-specific DCI Over the aggregated radio resources of all dedicated VC(s).

Figure 5:
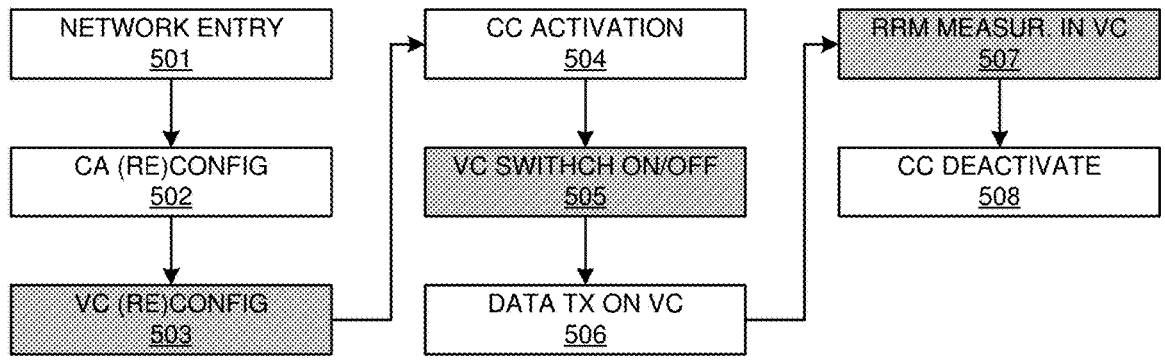
FIG. 5 illustrates an exemplary flow diagram of the virtual carrier operation procedure in accordance with embodiments of the current invention.

FIG. 5 illustrates an exemplary flow diagram of the virtual carrier operation procedure in accordance with embodiments of the current invention. At step 501, the UE performs network entry. At step 502, the UE performs the carrier aggregation (CA) configuration or reconfiguration. At step 503, the UE performs the VC configuration or reconfiguration. At step 504, the UE performs component carrier (CC) activation. At step 505, the UE performs VC switch on or switch off operation. At step 506, the UE performs data transmission on the configured VCs. At step 507, the UE performs RRM measurements on the VCs. At step 508, the UE deactivates the CC.

Figure 6:
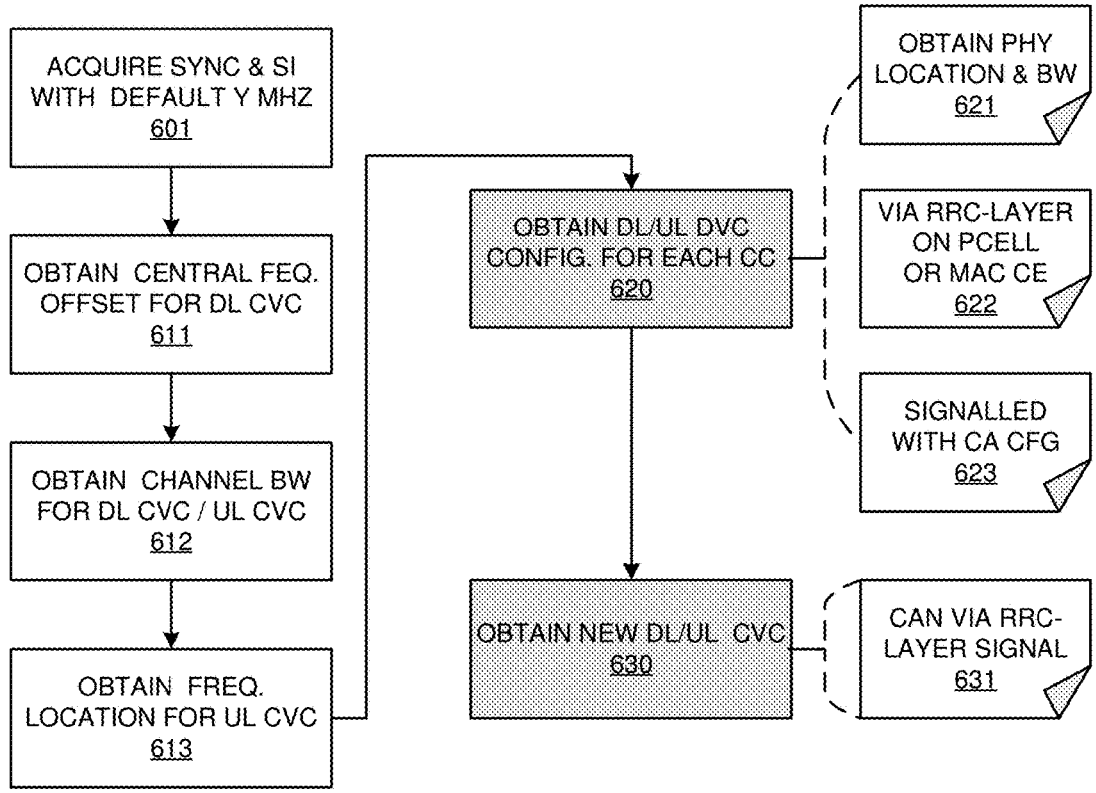
FIG. 6 illustrates an exemplary flow diagram of the network entry and virtual carrier configuration procedure in accordance with embodiments of the current invention.

FIG. 6 illustrates an exemplary flow diagram of the network entry and virtual carrier configuration procedure in accordance with embodiments of the current invention. At step 601, the UE acquires synchronization and system information with a default bandwidth of Y MHz. In one embodiment for a PCell using NRAI anchor, with 60 Khz subcarrier space, Y=20 MHz. In one embodiment, for the NRAI anchor, beacon signal (or synchronization signals) and MIB or compact SIB is used. At step 611, the UE obtains a central frequency offset value for the DL CVC. In one embodiment, the offset value is broadcasted in the system information. At step 612, the UE obtains the channel bandwidth for the DL CVC and the UL CVC. In one embodiment, the value of the channel bandwidth can be adjusted based on predefined criteria. In one embodiment, the predefined criterion is the load of the idle-mode UEs. It is applied for the following procedures on DL/UL CVC of Pcell, e.g. RACH for RRC-layer connection, UE capability negotiation, and RRC-layer configuration. At step 613, the UE obtains the physical location for the UL CVC. At step 620, the UE obtains DL and/or UL DVC configuration for each CC. In one embodiment, the DVC configuration is obtained through RRC-layer signaling on the PCell. The DVC configuration includes all potential DVCs for a component carrier. DVC configuration should include at least physical location & bandwidth of each DVC for a component carrier. The DVC configuration can be signaled together with CA configuration. In another embodiment, the DVC configuration is obtained through MAC CE. The DVC reconfiguration is transmitted on PCell. At step 630, the UE obtains new DL and/or UL CVC configuration. In one embodiment, when the configuration of DL/UL CVC is changed, UE can obtain new configuration of DL/UL CVC via RRC-layer signaling on Pcell without receiving updated system information.

FIG. 7 illustrates an exemplary flow diagram of virtual carrier switch-on/off procedure in accordance with embodiments of the current invention. At step 701, the UE receives VC switch on/off command. In one embodiment, the VC switch command is received via MAC signaling at step 710. The MAC signaling includes at least a bitmap indicating all potential VC configurations signaled by RRC-layer signaling. The UE receives the switch command in subframe (or slot) N at step 711. The UE monitors the dedicated MAC control in subframe (or slot) N+K, wherein the K is predefined constant integer. In one embodiment, a single dedicated PHY control to schedule data transmission over the aggregated data region of all switched-on DL VCs on a component carrier. The UE always obtains common PHY control on DL CVC of PCell.

In another embodiment, the VC switch command is received via PHY signaling at step 720. In one embodiment, the PHY signaling consists of at least a bitmap indicating all potential VC configurations signaled by RRC-layer signaling. The UE receives the switch command in subframe (or slot) N at step 711. The UE monitors the dedicated PHY control in subframe (or slot) N+K, wherein the K is predefined constant integer. In one embodiment, a single dedicated PHY control to schedule data transmission over the aggregated data region of all switched-on DL VCs on a component carrier. The UE always obtains common PHY control on DL CVC of PCell.

FIG. 8 illustrates an exemplary flow diagram of UE triggered UL VC switch command in accordance with embodiments of the current invention. At step 801, the UE transmit triggering signal via dedicated PHY, MAC or RRC-layer signaling (step 831), including at least one of the following information: Buffer status report for UL, Requested UL bandwidth, Requested UL resources, and UE identification (step 832). At step 810, the UE receives UL VC configuration switch command from the network after transmitting the triggering signal. At step 820, the UE performs switch on/off operation based on the received switch command from the network.

FIG. 9 illustrates an exemplary flow diagram of the RRM measurement for virtual carriers in accordance with embodiments of the current invention. At step 901, the UE starts the RRM measurement in the VC operation. At step 910, the UE determines whether only the DL DVC is switched-on. If step 910 determines yes, the UE performs RRM measurement on the CVC with a gap. It implies UE does not have the capability to monitor PHY control on both DL CVC and DL DVC at the same time. The UE monitors PHY control on DL DVC and switch its center frequency back to DL CVC during the configured measurement gap for RRM measurement periodically. If step 910 determines no, the UE performs RRM measurement on the CVC without a gap. It implies UE has the capability to monitor PHY control on both DL CVC and DL DVC at the same time.

Figure 10:
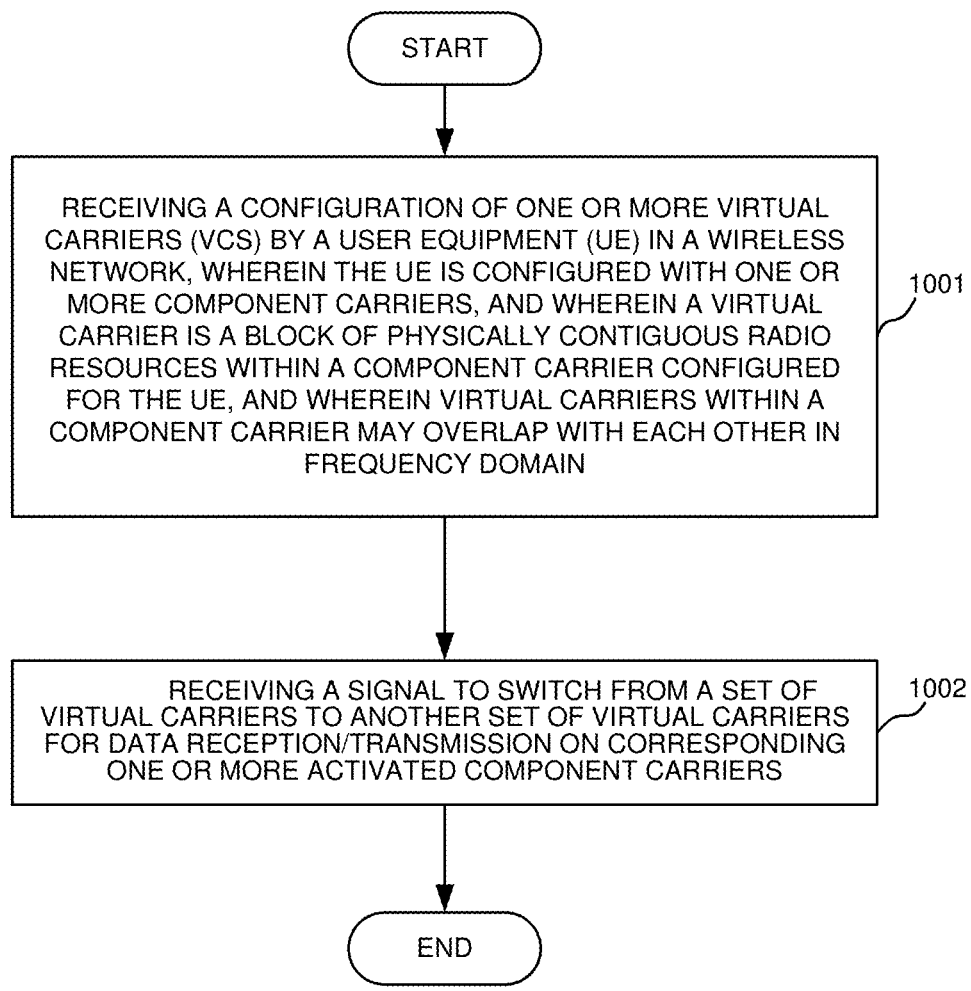
FIG. 10 shows an exemplary flow chart of the UE performing network entry and VC configuration in a VC operation in accordance with embodiments of the current invention.

FIG. 10 shows an exemplary flow chart of the UE performing network entry and VC configuration in a VC operation in accordance with embodiments of the current invention. At step 1001, the UE receives a configuration of one or more virtual carriers (VCs) in a wireless network, wherein the UE is configured with one or more component carriers, and wherein a virtual carrier is a block of physically contiguous radio resources within a component carrier configured for the UE, and wherein virtual carriers within a component carrier may overlap with each other in frequency domain. At step 1002, the UE receives a signal to switch from a set of virtual carriers to another set of virtual carriers for data reception/transmission on corresponding one or more activated component carriers.

Figure 11:
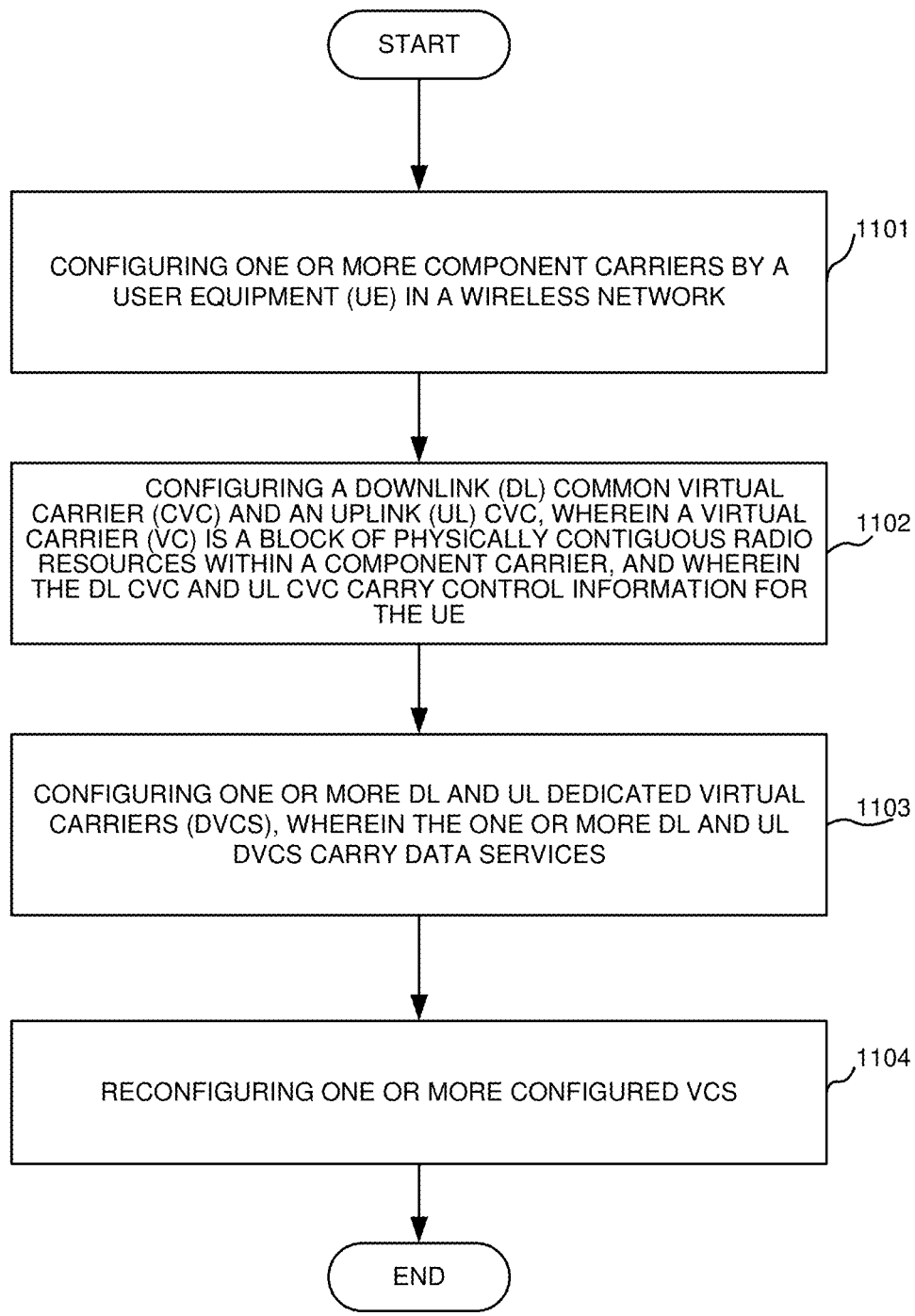
FIG. 11 shows an exemplary flow chart of the UE performing VC switch command in a VC operation in accordance with embodiments of the current invention.

FIG. 11 shows an exemplary flow chart of the UE performing VC switch command in a VC operation in accordance with embodiments of the current invention. At step 1101, the UE configures one or more component carriers in a wireless network. At step 1102, the UE configures a downlink (DL) common virtual carrier (CVC) and an uplink (UL) CVC, wherein a virtual carrier (VC) is a block of physically contiguous radio resources within a component carrier, and wherein the DL CVC and UL CVC carry control information for the UE. At step 1103, the UE configures one or more DL and UL dedicated virtual carriers (DVCs), wherein the one or more DL and UL DVCs carry data services. At step 1104, the UE reconfigures one or more configured VCs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving, by a user equipment (UE), a common virtual carrier (CVC) configuration for one or more CVCs, wherein each CVC is configured with a corresponding CVC frequency location and a corresponding CVC bandwidth through system information in a wireless network, and wherein a virtual carrier (VC) is a block of physically contiguous radio resources within a component carrier configured for the UE;
receiving a dedicated VC (DVC) configuration for one or more DVCs of the UE through radio resource control (RRC)-layer signaling;
configuring one or more uplink (UL) or downlink (DL) CVCs for the UE based on the CVC configuration, wherein system information for network entry is carried in radio resources of the one or more CVCs;
configuring one or more UL or DL DVCs for the UE based on the DVC configuration, wherein data services are carried in the radio resources of the one or more DVCs; and
receiving a signal to switch on/off at least one of the configured VCs.

2. The method of claim 1, wherein the DL CVC is configured on a primary cell (Pcell) component carrier, and wherein the configuring of the DL CVC involves:
obtaining a central frequency offset value of the DL CVC; and
obtaining a DL-CVC channel bandwidth for the DL CVC from system information.

3. The method of claim 1, wherein the configuring of the UL CVC involves: obtaining a physical location and a UL-CVC channel bandwidth from system information.

4. The method of claim 1, wherein the configuring of the one or more DL and UL DVCs involves: obtaining a DVC configuration for each configured component carrier through a radio resource control (RRC)-layer signaling on a primary cell (PCell).

5. The method of claim 1, wherein the DVC configuration for a corresponding DVC comprises a physical location and a channel bandwidth for the corresponding DVC.

6. The method of claim 1, further comprising: obtaining a new CVC configuration through RRC-layer signaling on a primary cell (Pcell).

7. The method of claim 1, wherein the UE only accesses DL CVC on a primary cell (PCell), and wherein the UE monitors downlink control information (DCI) over a reserved DL control region within the DL CVC.

8. The method of claim 1, wherein the UE accesses DL CVC and one or more DL DVCs on a primary cell (PCell), and wherein the UE monitors broadcasting downlink control information (DCI) over a reserved DL control region within the DL CVC, and wherein the UE monitors UE-specific DCI over aggregated radio resources selecting from one of PCell resources comprising: a control region within the DL CVC, aggregated radio resources of the DL CVC and all DL DVCs, and over aggregated radio resources of all DL DVCs.

9. The method of claim 1, wherein the UE only accesses DL CVC on a secondary cell (SCell), and wherein the UE monitors a UE-specific downlink control information (DCI) over a reserved DL control region within the DL CVC.

10. The method of claim 1, wherein the UE accesses DL CVC and one or more DL DVCs on a secondary cell (SCell), and wherein the UE monitors UE-specific DCI over aggregated radio resources selecting from one of SCell resources comprising: a control region within the DL CVC, aggregated radio resources of the DL CVC and all DL DVCs, and over aggregated radio resources of all DL DVCs.

11. The method of claim 1, wherein the UE only accesses one or more DL DVCs on a secondary cell (SCell), and wherein the UE monitors a UE-specific downlink control information (DCI) over aggregated radio resources of all DL DVCs.

12. The method of claim 1, further comprising:
performing a radio resource management (RRM) measurement on the DL CVC without measurement gap if both the DL CVC and the one or more DL DVCs within a component carrier are switched on, otherwise, performing a RRM measurement on the DL CVC with a measurement gap, when only the one or more DL DVCs within a component carrier are switched on.

13. The method of claim 1, wherein the signal to switch is triggered by a UE message sent to the wireless network via a dedicated PHY, MAC or RRC-layer signaling, and wherein the UE message includes at least one element comprising a buffer status report for UL, a requested UL bandwidth, requested UL resources, and a UE identification.

14. The method of claim 1, wherein a configured smaller VC in a component carrier overlaps with a configured larger VC in the configured component carrier in frequency domain, wherein the configured smaller VC has a smaller bandwidth size than the larger VC.

15. The method of claim 14, wherein the configured larger VC fully overlaps the configured smaller VC, and wherein the configured larger VC has a larger bandwidth than the configured smaller VC.

16. The method of claim 15, wherein the configured smaller VC is a DL CVC and the larger configured VC is a DL DVC.

17. The method of claim 1, wherein the signal to switch is received in a PHY-layer signal at slot N, further comprising: monitoring a dedicated DL control at slot N+K in the second set of virtual carriers, wherein N and K are integer numbers.

* * * * *